March 26, 1935.  G. H. ACKER  1,995,288
WORM GEAR REDUCTION UNIT
Filed Nov. 10, 1931   3 Sheets-Sheet 1

INVENTOR
George H. Acker
BY
Austin & Dix
ATTORNEYS

March 26, 1935.  G. H. ACKER  1,995,288
WORM GEAR REDUCTION UNIT
Filed Nov. 10, 1931  3 Sheets-Sheet 2
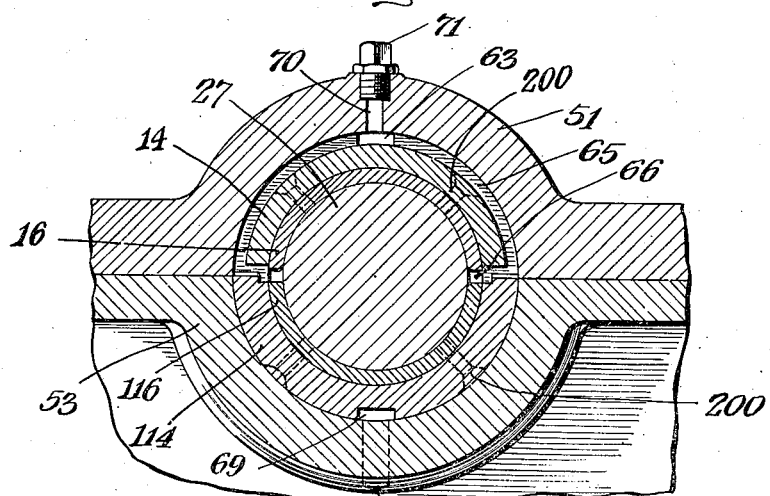
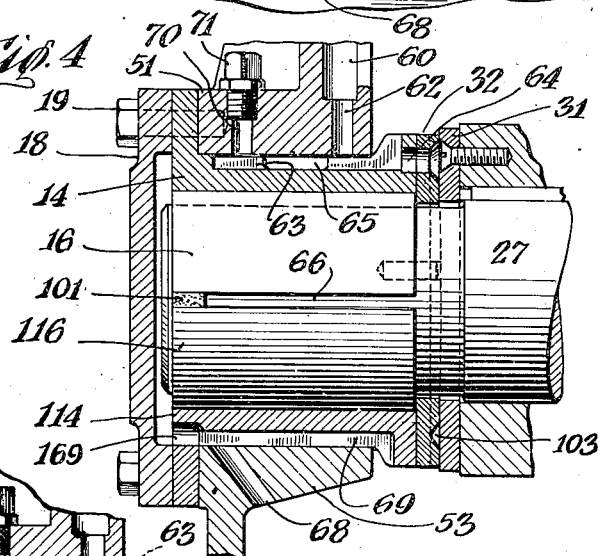
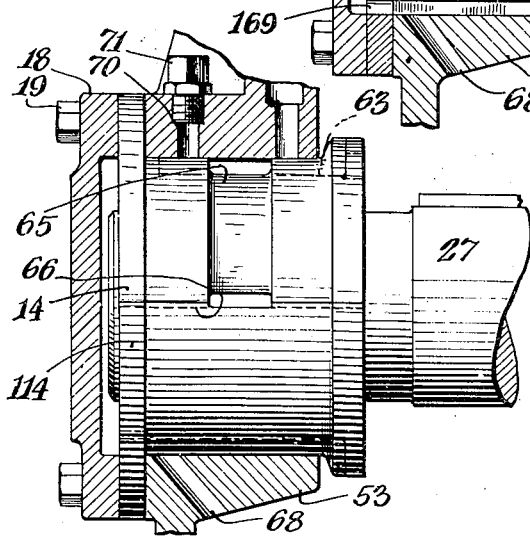
INVENTOR
George H. Acker
BY
Austin & Dix
ATTORNEYS

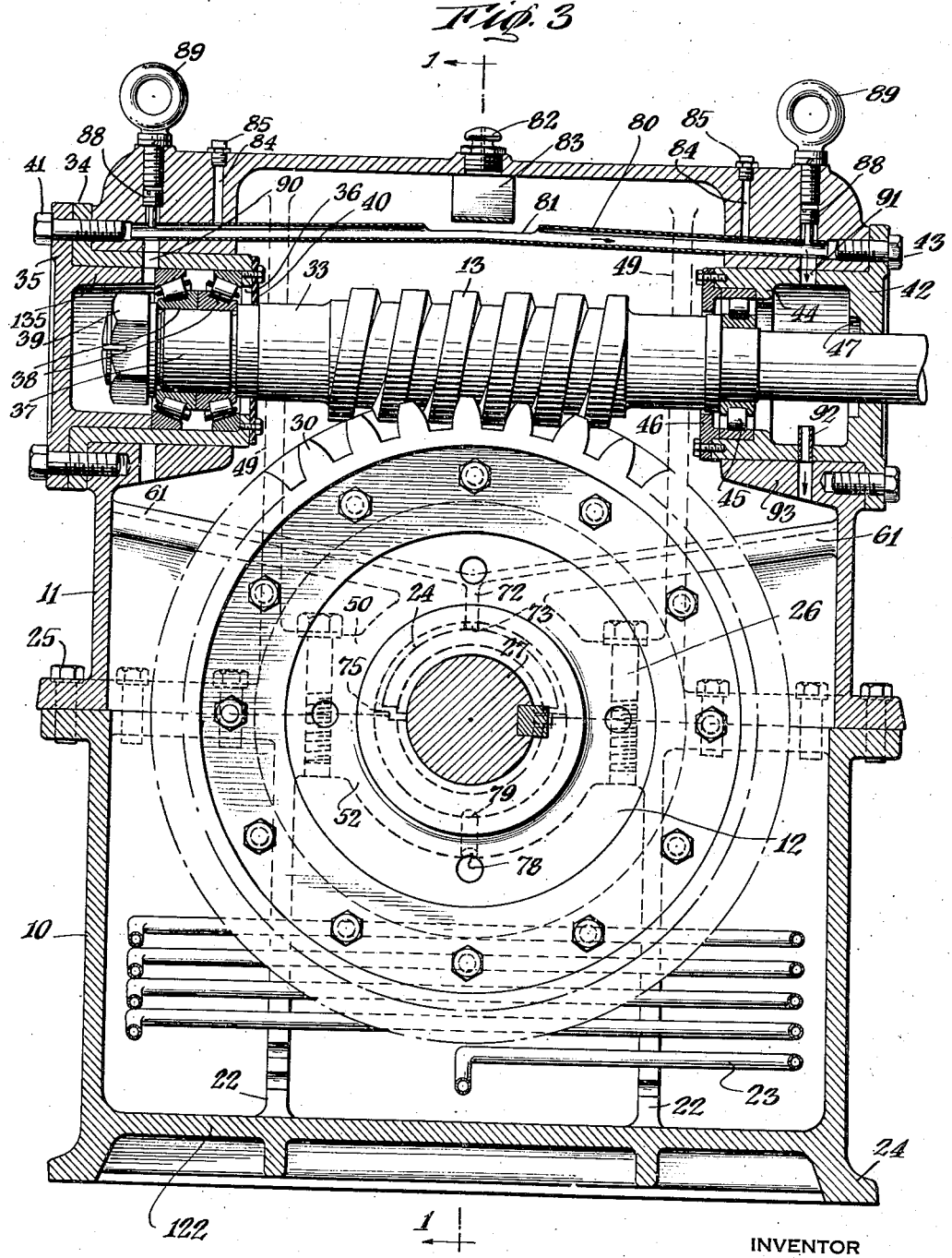

Patented Mar. 26, 1935

1,995,288

UNITED STATES PATENT OFFICE 1,995,288

WORM GEAR REDUCTION UNIT

George H. Acker, Cleveland, Ohio, assignor to The Cleveland Worm and Gear Company, Cleveland, Ohio, a corporation of Ohio Application November 10, 1931, Serial No. 574,143

10 Claims. (Cl. 184—6)

The invention relates to lubrication of machinery, and more particularly to lubrication of worm gear reduction units.

According to a preferred form of the invention, a worm gear reduction unit may be provided in which the worm is located above the worm wheel and the worm wheel dips into the oil reservoir. A receptacle may be provided above the worm which catches oil and leads to the bearings for the worm. A baffle may be provided above the oil catching receptacle on which the drops of oil thrown by the rotating worm collect and drip into the receptacle. If desired, the baffle may be placed under the air vent in the casing.

If desired, provision may also be made for lubricating automatically the bearings for the worm wheel shaft. Oil troughs may be provided in the side walls of the casing which collect the oil running down the side walls and a system of grooves and holes may connect the oil troughs with the worm wheel shaft bearings to lubricate them. This arrangement may be made to lubricate both the axial and radial bearings. The radial bearings may be bronze bearings.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a cross section of the worm gear reduction unit provided with the lubrication arrangements according to the invention, taken on the line 1—1 of Fig. 3;

Fig. 2 is a detail taken on the line 2—2 of Fig. 1; and

Fig. 3 is a section taken on the line 3—3 of Fig. 1.

Figs. 4 and 5 are sectional details further illustrating the bearing shown in Fig. 2.

Figure 1:
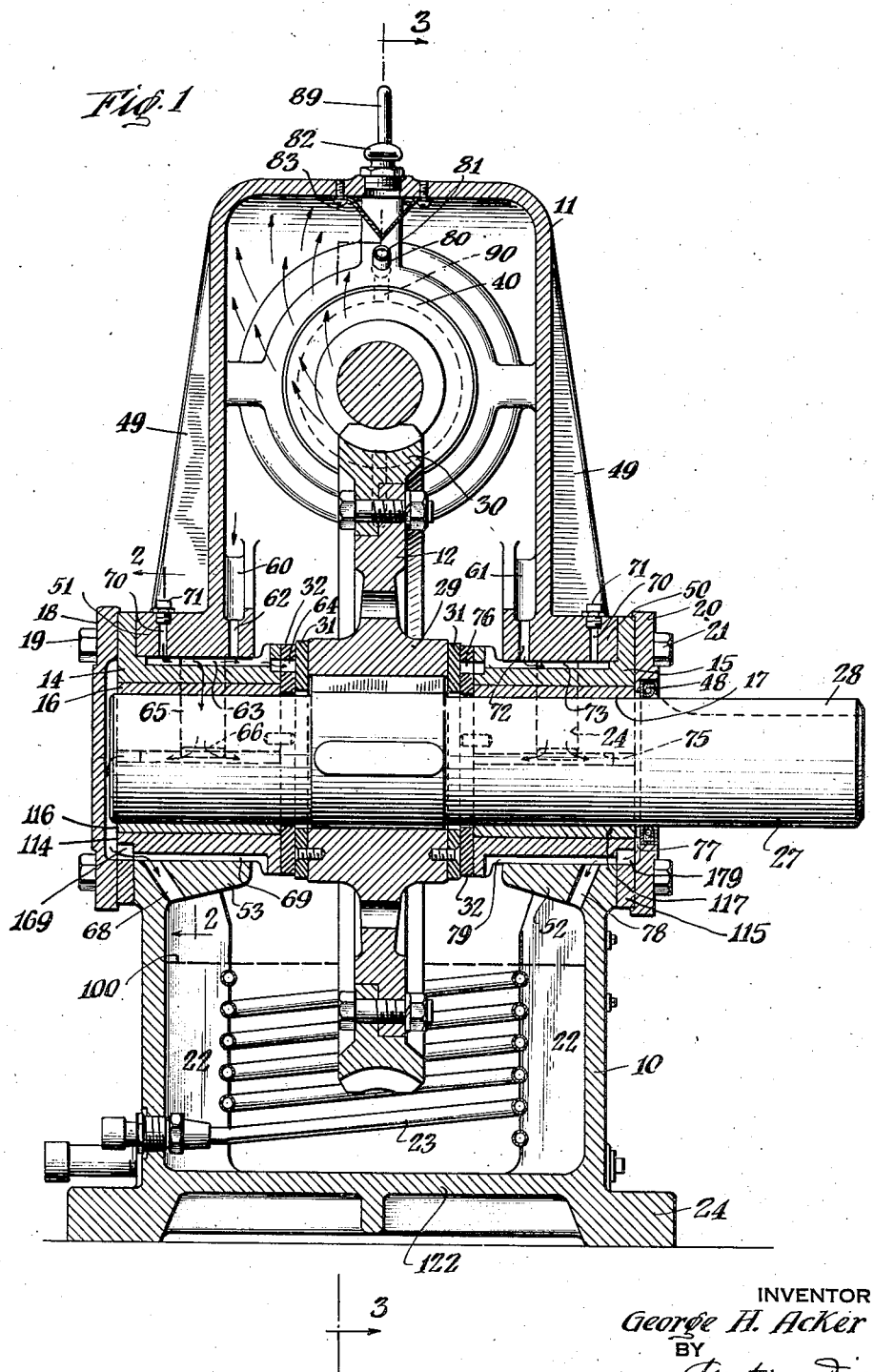

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the worm gear reduction unit comprises a suitable casing or housing made up of a lower section 10, an upper section 11, each having meeting flanges which are connected by bolts 25. These sections also carry bearing parts 50, 51 on the upper section and 52, 53 on the lower section, corresponding bearing parts being connected by bolts 26.

Journalled within the casing is a worm wheel 12 meshing a worm 13 disposed above it. The worm wheel 12 is mounted upon a shaft 27 which is journalled between the bearing parts 50, 52 and 51, 53.

Referring more particularly to Figs. 1, 2, 4 and 5, located within the bearing parts 51, 53 and 50, 52 are removable bearing half sleeves 14, 114 and 15, 115 which are lined with bronze half bushings, indicated by 16, 116 and 17, 117. The bronze half bushings 16, 116 and 17, 117 are secured to the half sleeves 14, 114 and 15, 115 by screws 200, as shown in Fig. 2.

The worm wheel 12 is suitably keyed to the shaft 27 and supports a ring gear 30 suitably secured thereto in any desired manner. Secured to the worm wheel 29 are axial thrust washers 31, while secured to only the removable upper half sleeves 14 and 15 are axial thrust washers 32. Washers 31 and 32 both clear the shaft 27, the clearance for washer 31 being greater than for washer 32. Washers 31 are therefore constrained to rotate with the worm wheel 29 while washers 31 and 32 remain stationary with the sleeves 14 and 15.

To close the housing at the worm wheel bearings a cap 18 is provided through which a number of bolts 19 pass, these bolts also passing through the flanges of half sleeves 14, 114 into the bearing parts 51 and 53. At the other side a flat collar 20 is provided and also a plurality of bolts 21 passing therethrough and through the flanges of half sleeves 15, 115 into the bearing parts 50 and 52. If desired, a leather oil seal, indicated by 48, may be placed in the recess in the ring 20 to prevent leakage of oil along the shaft 27.

The shaft 27 is provided with a keyway 28 and is adapted to receive in overhung relation a power transmitting wheel such as a gear (not shown). It will be noted that the lower section 10 of the casing is suitably braced and ribbed for strength, being provided with ribs 22 extending from the bottom wall 122 up to the bearing parts 52 and 53. The ribs 22 may be provided with grooves into which a cooling coil 23 may fit.

The lower section 10 is provided with a heavy base 24 by which the unit may be secured to a support, if desired. The upper section 11 is also suitably braced by tapering flanges 49 extending to the bearing parts 50 and 51.

The worm 13 is mounted upon a shaft 33 which is journalled in removable bearing members 34 and 42.

Referring to the left hand bearing for the worm in Fig. 3, the worm shaft 33 is provided with a reduced end 37 on which are mounted the inner races of a pair of opposed tapered roller bearings, indicated by 38. The outer races of these bearings are supported by the bearing sleeve 34 and are retained between a flange 36 on the bearing sleeve 34 and a flange 135 on the removable cover 35. The removable cover 35 is secured in position by a series of bolts 41 passing through the bearing sleeve 34 into the wall of the upper section.

The end of shaft 37 is screw threaded and a nut 39 is located thereon to securely clamp the inner races of the roller bearings 38 against the shoulder formed by the reduced portion 37. If desired, a gasket 40 may be provided to seal the oil within the bearing.

Referring now to the right hand worm shaft bearing in Fig. 3 a single plain roller bearing 45 is provided whose outer race is seated within the bearing member 42 between a flange 44 and a removable plate 46. The inner race of the roller bearing 45 is grooved to receive the rollers and this race seats upon a stepped portion of the shaft 33 and is fixedly mounted thereon. If desired, a recess 47 may be provided in the bearing member 42 to receive a leather oil seal to prevent leakage of oil along the shaft 33 where it passes out of the casing. The bearing member 42 is removably held in position by a plurality of bolts 43.

It will be understood that the outer end of the worm wheel shaft 33 is adapted to receive in overhung relation a power transmitting wheel such as a gear (not shown).

To lubricate the worm wheel bearings troughs 60 and 61 are provided on the inner walls of the upper sections, these troughs sloping toward the middle, at which points openings 62 and 72 are provided leading to grooves 63 and 73 in the upper bearing half sleeves 14 and 15 (Figs. 2, 4 and 5).

In order to lead oil to a point between the thrust washers 31 and 32 a hole 64 is provided in the thrust washer 32 in line with a hole in the flange of the bearing half sleeve 14. Also, the bearing half sleeve 14 is provided with a circular groove 65 and at the ends of this groove 65 the half sleeves 14 and 114 are notched forming holes connecting with axial grooves 66 formed by the spacing between half bushings 16 and 116. Felt pads 101 may be located between the ends of half bushings 16 and 116 to prevent too much oil from running out the ends.

The lower bearing half sleeve 114 may also be provided with a hole 169 and a bottom groove 69 opening into the bottom of the casing and the bearing part 53 may be provided with a hole 68 communicating with the groove 69 to drain oil caught in the space between the cap 18 and the end of shaft 27.

A similar arrangement may be provided for lubricating the right hand bearing for the worm wheel in Fig. 1 consisting of the peripheral groove 24 communicating with the axial groove 75 between the half bushings 17 and 117. Lower hole 179, groove 79, hole 78 and groove 77 in collar 20 may be provided to draw oil from the outer end of the half bushings 17, 117. Similarly, a hole 76 may be provided in stationary thrust washer 32 in line with a hole in the adjacent flange communicating with the groove 73.

It will be understood that oil grooves indicated by 103 may be provided in the stationary end thrust washers 32 communicating with the holes 64, 76.

If desired, additional holes 70 may be provided in the bearing parts 50 and 51 communicating with grooves 63 and 73, said holes normally being closed by plugs 71. If desired, the plugs 71 may be removed and ordinary oil cups substituted therefor for a purpose hereinafter described.

Referring now to the oiling arrangement for the worm, a seamless tube 80 sloping from the middle to both ends is provided, this tube being located in openings which are extensions of the upper openings for the bolts 41 and 43. This tube 80 has the upper portion thereof cut away as at 81, and located over the tube is a baffle member 83 suitably connected to the top wall of the upper casing section. A removable plug 82 having a vent hole may be located over the baffle 83. The baffle 83 is V-shaped as shown in Fig. 1 and allows oil to drip from the lower edge into the open portion 81 of the tube 80.

The tube 80 is held in proper position by positioning setscrews 88 which are threaded into the same recesses which receive the lifting eyebolts 89. Openings are provided in the tube 80 in line with the holes 90 and 91 which lead the oil to the bearing spaces for the bearings 38 and 45.

If desired, additional holes 84 may be provided leading into the tube 80 being normally closed by plugs 85. If desired, these plugs 85 may be removed and oil cups substituted therefor, as hereinafter explained.

If desired, an overflow pipe 92 is provided in the bearing member 42 to limit the height of oil in the bearing space to prevent undue leakage where the shaft 33 passes out of the casing. This pipe 92 communicates with a hole in the flange 93 of the casing and allows the oil to overflow back into the reservoir at the bottom of the casing.

In operation, the reservoir will be filled with oil up to a level somewhat as indicated by the line 100. This allows the worm wheel 12 to dip well within the reservoir and to thoroughly coat the worm 13 at the point of mesh. Rotation of the high speed worm 13 throws the oil on the adjacent walls of the casing, as indicated by the arrows in Fig. 1. This oil runs down the side walls into the oil troughs 60 and 61 to lubricate worm wheel bearings and also is thrown against the baffle 83 from which it drips into the open portion 81 of the tube 80.

Oil received by the tube 80 runs in the direction of the arrows into the bearing spaces of the bearings for the worm 13, thoroughly lubricating the bearings 38 and 45, whence the oil drips back into the reservoir. The height of the oil within the bearing member 42 is limited by the overflow tube 92, as indicated in Fig. 3.

The oil which collects in the troughs 60, 61 runs down through the connecting channels into the grooves 63 and 73 and into the grooves 66 and 75, as indicated by the arrows. This oil is fed between the stationary and movable end thrust washers 32 and 31 and also between the bronze bushings and the shaft journals. The oil collects in the lower regions of the bearings and is led back into the reservoir through the lower grooves 69 and 79 and holes 68 and 78.

Thus an oiling system has been provided which is absolutely automatic in operation and requires no additional moving parts. Even though the level of oil in the reservoir is below the bearings for both the worm and the worm wheel these bearings are amply fed with oil. No pump is required, nor is the use of oil cups essential. The lubrication is positive and the bearings are always supplied with a surplus of lubricant.

If desired, for starting purposes before the system has had a chance to work to circulate the oil the plugs 71 and 85 may be removed and oil fed therein either by an oil can or by the provision of oil cups permanently mounted at these points. After the machine has gotten up to speed and is running properly the oil cups are not required.

While certain novel features of the invention have been disclosed and are pointed out in the annexed claims, it will be understood that various omissions, substitutions and changes may be made by those skilled in the art without departing from the spirit of the invention.

What is claimed is:

1. In a worm gear reduction unit, a casing, a worm wheel journalled in said casing and dipping into an oil bath, a worm above said worm wheel and meshing therewith, bearings in said casing for journalling said worm, a receptacle above said worm and a conduit connecting said receptacle with said bearings, said casing having a vent hole in the top, a baffle under said vent hole to prevent oil from being thrown out therethrough and also serving to collect drops of oil, said baffle being located over said receptacle and dropping oil therein.

2. In machinery of the class described, a casing, gearing in said casing, a bearing for said gearing, a catch receptacle to catch lubricant, means to lead said lubricant from said receptacle to said bearing, and a member above said catch receptacle serving to cause drops of lubricant thrown by said gearing to form thereon and to fall into said receptacle, said catch receptacle being located in the midst of the spray of lubricant thrown by the gearing and being substantially entirely enveloped by said spray.

3. In machinery of the class described, a wall having an opening, a bearing housing connected to said wall, a shaft passing through said wall opening and journalled in said housing, said housing having a recess, an overflow conduit to limit the upper level of lubricant in said housing to a point below said wall opening, and means to supply said housing with lubricant.

4. In machinery of the class described, a casing having an opening, a sleeve positioned in said opening and having an external flange and an internal flange, a rolling friction type bearing within said sleeve against said internal flange, a shaft in said bearing, a cap having a tubular flange fitting within said sleeve against said bearing and also having an external flange, a plurality of bolts passing through both said external flanges into said casing, said casing having an opening in line with one of the upper of said bolts, a tube in said opening, said tube, casing, sleeve and tubular flange having openings to convey oil from said tube to said bearing, and means for feeding oil to said tube.

5. In machinery of the class described, a casing having an opening, a bearing sleeve in said opening having an external flange and an internal bearing recess and internal shoulder, a rolling friction type bearing against said shoulder, a shaft in said bearing, a removable collar surrounding said shaft holding said bearing against said shoulder, said sleeve having a sealing portion surrounding said shaft through which said shaft projects, a plurality of bolts passing through said external flange into said casing, said casing having an opening in line with an upper one of said bolts, a conduit in said opening, said casing and sleeve having openings connecting said conduit to said bearing recess, means for supplying said conduit with oil, an overflow tube in the bottom of said bearing space passing through said sleeve and communicating with the bottom of said casing to limit the height of oil in said bearing recess.

6. In a worm gear reduction unit, a separable casing having bearing openings in the upper section for a worm shaft, said casing having aligned openings near the top on opposite sides thereof, a tube positioned in said aligned openings having an opening in the top thereof to collect oil, additional openings intersecting said first openings, setscrews in said additional openings holding said tube in position, lifting members also positioned in said additional openings, flanged bearing members in said bearing openings, fastening bolts passing through said flanged bearing members into said casing certain of which are positioned in said tube openings, said casing having openings connecting said tube with said bearing members.

7. In machinery of the class described, a casing having bearing openings, bearing sleeves in said openings, a shaft carrying a gear and journalled in said sleeves, said bearing sleeves having external flanges, a plurality of bolts passing through said flanges into said casing, said casing having substantially aligned openings in line with certain of said bolts, a conduit extending across the casing and positioned in said openings, said conduit having an opening in the top thereof, means positioned just above said opening and causing oil thrown about in the casing to drop into said conduit, and conduit means connecting said conduit and the inside of said sleeves.

8. In a worm gear reduction unit, a casing having bearing openings, bearing sleeves in said openings, bearings carried by said sleeves, a worm shaft carrying a worm and journalled in said bearings, said bearing sleeves having external flanges, a plurality of bolts passing through said flanges into said casing, said casing having substantially aligned openings in line with certain of said bolts, a tube extending across the casing and positioned in said openings, said tube having an opening in the top thereof, a V-shaped member having its lower point positioned just above said opening and causing oil thrown on it by said worm to drop into said tube, and conduit means connecting said tube and said bearings.

9. In machinery of the class described, a casing having a bearing sleeve, a shaft journalled within said sleeve, an abutment on said shaft having end thrust bearing with said sleeve, a catch receptacle in said casing for catching oil thrown about in said casing, a conduit extending lengthwise of the sleeve receiving oil from said catch receptacle and leading it to said abutment to lubricate the end thrust bearing.

10. In a worm gear reduction unit, a casing, a worm wheel journalled in said casing, a worm above said worm wheel and meshing therewith, a bearing in said casing for journalling said worm, a catch receptacle above said worm, a conduit connecting said catch receptacle with said bearing, a collecting member above said catch receptacle serving to cause drops of lubricant thrown by said worm to form thereon and to fall into said catch receptacle, said catch receptacle being located in the midst of the spray of lubricant thrown by said worm and being substantially entirely enveloped by said spray.

GEORGE H. ACKER.